Patented Aug. 17, 1948

2,447,322

UNITED STATES PATENT OFFICE 2,447,322

INFRARED-RESPONSIVE PHOSPHORS

Gorton R. Fonda, Schenectady, N. Y., assignor to General Electric Company, a corporation of New York No Drawing. Application November 4, 1943, Serial No. 508,959

5 Claims. (Cl. 252—301.6)

The present invention comprises an improved series or family of phosphors which, after having been excited by ultraviolet radiation, are capable of being stimulated by infrared (IR) radiation to emit light of notable brightness even after sufficiently long lapse of time to cause visible phosphorescence to fall to negligible intensity. For convenience these phosphors will be referred to herein as IR phosphors.

The function of retaining energy which may be released by infrared radiation is greatly enhanced by the presence in IR phosphors of an active agent herein termed a storage agent. The property of being susceptible to stimulation by infrared radiation renders IR phosphors capable of use in signaling devices.

My present invention provides improved IR phosphors which comprise zinc sulfide or zinc-cadmium sulfide as a main or base emitter, the phosphor being associated with small amounts both of activator and storage agent. The roles of both storage agent and activator may be assumed by a single substance, as for instance compounds of lead.

Herein described IR phosphors are stimulated to emit light when radiated by infrared of about 1.0 to 1.6 $\mu$ (10,000 to 16,000 Å.), with a peak at about 1.3 $\mu$. As activators of activity in phosphors are well known, it will be necessary only to state that one or more of the commonly used activators may be employed, such, for example, as manganese or copper, or a combination of manganese and copper.

A considerable number of substances are capable of functioning as storage agents or as a means for retarding the exhaustion of the luminescence (energy) resulting from the activation of a zinc sulfide type phosphor with ultraviolet. As will later be explained more fully, storage agents lengthen the time interval during which such phosphors are responsive to infrared stimulation. The IR phosphors, which may be non-luminous or may still be faintly luminous as a result of the ultraviolet excitation are caused by the impact of infrared radiation to assume a new stage of luminosity which is brighter and distinguishes from any residual phosphorescence, if such should be present.

Lead compounds are the most efficient storage agents for IR phosphors whereby energy is retained, although various compounds of rare earth and common metals can be used with good effect.

New in effectiveness as storage agents are the compounds of thorium, zirconium, bismuth, lanthanum and gadolinium. Zinc oxide has a moderate effect as a storage agent and is capable of use with other storage agents. Although less effective, compounds of tin, cerium, samarium, iron, colombium, titanium and antimony also may be used as storage agents. Erbium, neodymium, scandium, thallium and yttrium can be used as storage agents but under present conditions are not so desirable as the other agents mentioned.

Optimum amounts of storage agents in most cases are less than 0.5 per cent, sometimes much lower. Iron, for example, is most effective as a storage agent in the neighborhood of 0.001 per cent.

Lead compounds not only are effective storage agents but also function as activators. Lead serves to activate two emission bands in zinc sulfide. One band is in the range of green light and the other in the range of yellow-orange light. The green band is excited by the near ultraviolet and visible radiations up to about 4450 Å. and the yellow-orange band is excited by radiations in the range of 4450 to 5300 Å.

It is ordinarily desirable to add several per cent of lead compound, or even of metallic lead, to the zinc sulphide in the preparation stage of the IR phosphor. A good deal of addition material is lost during the firing of a phosphor composition. It has been determined that only about 0.5 per cent of lead compounds remain in the completed phosphor.

In the higher concentrations of lead compounds in the phosphor, the orange band of radiations appears and becomes with increase of lead content more predominant in the phosphorescent light, the green phosphorescent band becoming weaker. The latter effect is believed to be due to a more effective storage of the green luminous energy, for the reason that green luminescence appears when the IR zinc sulfide phosphor receives infrared stimulation. Other additions, such as lanthanum and gadolinium, serve to enhance the storage effectiveness of lead in the IR phosphor. When one or both of these elements are present in IR phosphors in addition to lead the brightness of the luminescence stimulated by infrared is increased as well as its persistence under continued stimulation.

The effectiveness of lead as a storage agent becomes still more pronounced when it is used in conjunction with a separate activator as, for example, copper or manganese, or compounds of both of these metals used as activators jointly. The brightness and persistence of the stimulated luminescence is increased most notably in the presence of copper.

Many compounds of lead are suitable as storage agents, lead sulfate being one of the most efficient. However, other compounds of lead may be added to the phosphor, for example, the oxide or sulfide, and it may be added as powdered metallic lead.

Zinc sulfide, as usually obtained, is apt to contain zinc oxide or some free sulfur, depending on the method of preparation. I have found it to be sometimes desirable to add either some zinc compound or some sulfur compound to the zinc sulfide to combine with the uncombined ingredient of phosphor. For example, if unfired zinc sulfide base with its admixtures contains free sulfur, a few per cent of zinc oxide may be added advantageously in the preparation of a phosphor. On the other hand, if the zinc sulfide mixture contains uncombined oxide, then elemental sulfur or a compound of sulfur such as ammonium polysulfide may be added. Even independently of these considerations, the presence of some zinc oxide or of some zinc compound other than the sulfide appears desirable. As already indicated, it is desirable to add to the unfired phosphor mixture a considerable excess of lead as a chosen compound, or as elemental lead, to compensate for losses by vaporization during firing.

As previously stated, the brightness and persistence of the luminescence stimulated by infrared is increased with higher concentrations of lead in the zinc sulfide. When the lead is added as the oxide and sulfide, the maximum amount which can be favorably added is approximately 4 per cent. In the case of lead sulfate additions to a zinc sulfide phosphor, it has been found advantageous to employ additions in the range of above 4 and up to about 5 per cent lead content. Examples of favorable association of activator, storage agent with zinc sulfide as the following:

Example 1

An IR phosphor may be prepared from the following ingredients:

|  | Per cent |
|---|---|
| Lead sulfate | 4.8 |
| Copper (added as copper compound) | 0.001 |
| Zinc sulfide | Balance |

A suitable flux may be present in the usual percentage in this example as well as in others to follow.

The mixture is ground with enough alcohol to make a paste, which is dried at 110° C. and fired for 40 minutes at 1070° C. in a current of nitrogen. For the best effect, it is desirable that the firing and cooling of the phosphor should be so controlled that the zinc sulfide base of the completed product is in the hexagonal rather than in the cubic form. Green luminescence results after excitation with ultraviolet and stimulation by infrared.

Example 2

In some cases the zinc sulfide advantageously may be associated with cadmium sulfide. As a result of firing, a zinc-cadmium sulfide phosphor is produced. In the luminescent light derived from such double sulfide, the emitted light is shifted toward the yellow part of the spectrum.

Such a phosphor may be made up from the following mixture:

|  | Per cent |
|---|---|
| Lead sulfate | 5 |
| Copper (as nitrate) | 0.001 |
| Cadmium sulfide | 0.001 |
| Zinc sulfide | Balance |

Example 3

An IR phosphor is prepared by grinding to a paste with alcohol, drying at 110° and firing at 1070° C. in nitrogen for 40 minutes, following the procedure as stated in connection with Example 1.

|  | Per cent |
|---|---|
| Lead sulfate ($PbSO_4$) | 2 |
| Zinc sulfide | Balance |

The resulting phosphor first having been excited with ultraviolet and thus being rendered susceptible to stimulation gives when radiated with infrared a green luminescence. It possesses a shorter and weaker phosphorescence than the material of Example 1.

Example 4

An IR phosphor is prepared as indicated for Examples 1 and 2 from a mixture of the following:

|  | Per cent |
|---|---|
| Lead sulfate | 5 |
| Manganese (conveniently introduced as manganese nitrate) | 0.1 |
| Zinc sulfide | Balance |

This phosphor, when excited with ultraviolet gives, upon subsequent stimulation with infrared radiation, a red luminescence.

Example 5

Another IR phosphor may be prepared by the described treatment applied to the following ingredients:

|  | Per cent |
|---|---|
| Lead sulfate | 5 |
| Copper (added as copper nitrate) | 0.001 |
| Manganese (added as manganese nitrate) | 0.10 |
| Zinc sulfide | Balance |

The phosphor resulting from the heat treatment of these mixed materials when excited with ultraviolet gives upon stimulation with infrared radiation on orange luminescence.

Example 6

Still another IR phosphor may be prepared from the following mixture:

|  | Per cent |
|---|---|
| Lead oxide | 2 |
| Lanthanum (added as lanthanum nitrate) | 0.1 |
| Zinc sulfide | Balance |

The phosphor prepared as explained in connection with Example 1 when excited with ultraviolet gives upon stimulation with infrared a yellow luminescence.

Example 7

Lanthanum compounds may be used as storage agents in place of lead compounds.

|  | Per cent |
|---|---|
| Lanthanum | 0.03 |
| Copper (added as copper nitrate) | 0.001 |
| Zinc sulfide | Balance |

The phosphor prepared as indicated in Example 1 gives upon excitation with ultraviolet and stimulation with infrared a yellow luminescence.

*Example 8*

|  | Per cent |
|---|---|
| Thorium (added as thorium nitrate) | 0.1 |
| Copper (added as copper nitrate) | 0.0001 |
| Zinc sulfide | Balance |

A phosphor prepared from these ingredients, as described in connection with Example 1, gives upon excitation with ultraviolet and subsequent stimulation with infrared a blue luminescence.

Although I do not wish to be bound by the following theory, it is my belief that the occurrence of phosphoresence in a phosphor upon excitation with ultraviolet is to be ascribed to the formation of "trapping states" or metastable energy levels in the phosphor into which the electrons produced by ultraviolet excitation are liable to fall after they have been raised by the process of excitation from their normal filled state to an upper, unfilled band. Such electrons are thereby prevented from returning directly to their former state, an occurrence that would give rise to luminescence. Indeed, they are maintained in storage at the high energy level corresponding to their excited condition until released by the reception of sufficient energy to allow them to escape and reenter the upper unfilled band over the barrier characteristic of the trapping state. It is the height of the barrier which determines the magnitude of the energy and thereby the wave length of the infrared radiation falling upon the phosphor necessary to effect the escape of the electrons. After their escape and after their entry into the upper unfilled band, they are given an opportunity of returning to their original state, accompanied by an emission of their excited energy as luminescence.

In normal phosphors this assumed barrier is relatively low. The energy of thermal agitation characteristic of room temperature conditions is sufficient to release the trapped electrons. The fact that so little additional luminescence is released by radiation of higher energy content, such as corresponds to the near infrared, is evidence that there are present in normal phosphors very few trapping states having higher energy barriers. It may be assumed, therefore, that the special storage agents above described introduce additional trapping states, the energy barriers of which are so high that the excited electrons lodged within them cannot escape under the thermal conditions of room temperature. They require radiation of greater energy content to bring about their release. The near infrared radiation is capable of furnishing the required stimulus which thus results in luminescence.

What I claim as new and desire to secure by Letters Patent of the United States, is:

1. An infrared-responsive phosphor consisting essentially of zinc sulfide, approximately .001 per cent of a copper activator, and approximately 0.5 per cent of lead as an energy storage agent.

2. A composition convertible by heat-induced reaction to an infrared-responsive phosphor, said composition consisting essentially of zinc sulfide, about four to five per cent by weight of lead sulfate and approximately 0.001 to 0.1 per cent by weight of an activator of luminescence chosen from the group consisting of copper, manganese and mixtures thereof.

3. An infrared-responsive phosphor consisting essentially of zinc sulfide, approximately .001 to .1 per cent by weight of an activator of luminescence consisting of both copper and manganese and about one-half per cent of lead by weight.

4. A composition convertible by heat-induced reaction to an infrared-responsive phosphor, said composition consisting essentially of zinc sulfide, about two to five per cent of a compound chosen from the group consisting of lead sulphate, lead oxide, and lead sulfide, and approximately .001 to .1 per cent by weight of an activator chosen from the group consisting of copper, manganese and mixtures thereof.

5. A phosphor which consists essentially of zinc sulfide, approximately one-half of one per cent of lead, calculated as elemental lead, whereby storage of energy is induced in a state releasable as luminescence by infrared radiation and approximately .001 to .1 per cent by weight of an activator of luminescence chosen from the group consisting of copper, manganese and mixtures thereof.

GORTON R. FONDA.

REFERENCES CITED

The following references are of record in the file of this patent:

UNITED STATES PATENTS

| Number | Name | Date |
|---|---|---|
| 789,812 | Kunz | May 16, 1905 |
| 2,049,765 | Fischer | Aug. 4, 1936 |

FOREIGN PATENTS

| Number | Country | Date |
|---|---|---|
| 512,154 | Great Britain | Aug. 30, 1939 |
| 109,253 | Australia | Dec. 14, 1939 |
| 582,401 | Germany | Nov. 2, 1933 |

OTHER REFERENCES

Chem. Abstracts, vol. 16, page 205.
Ann. Physik, vol. 65, pages 189–215 (1921).